(12) United States Patent
Fuller

(10) Patent No.: US 7,949,416 B2
(45) Date of Patent: May 24, 2011

(54) MULTIVARIABLE CONTROL SYSTEM

(75) Inventor: James W. Fuller, Amston, CT (US)

(73) Assignee: United Technologies Corporation, Hartford, CT (US)

(*) Notice: Subject to any disclaimer, the term of this patent is extended or adjusted under 35 U.S.C. 154(b) by 301 days.

(21) Appl. No.: 12/115,574

(22) Filed: May 6, 2008

(65) Prior Publication Data

US 2009/0281641 A1 Nov. 12, 2009

(51) Int. Cl.
*G05B 13/02* (2006.01)
(52) U.S. Cl. ............... 700/31; 700/33; 700/34; 700/44; 703/2
(58) Field of Classification Search ............... 700/28–34, 700/38, 44–45, 52–53, 73–74; 701/11, 12, 701/38; 244/75.1–99.9; 702/185, 186; 703/2
See application file for complete search history.

(56) References Cited

U.S. PATENT DOCUMENTS

| 5,091,843 A | 2/1992 | Peckowski |
| 5,396,416 A | 3/1995 | Berkowitz |
| 5,479,897 A | 1/1996 | Kawai |
| 5,488,561 A | 1/1996 | Berkowitz |
| 5,704,011 A | 12/1997 | Hansen |
| 6,330,483 B1 | 12/2001 | Dailey |
| 6,882,889 B2 | 4/2005 | Fuller |
| 7,152,023 B2 | 12/2006 | Das |
| 7,203,554 B2 | 4/2007 | Fuller |
| 2004/0107012 A1 | 6/2004 | Das |

*Primary Examiner* — Albert Decady
*Assistant Examiner* — Dave Robertson
(74) *Attorney, Agent, or Firm* — Carlson, Gaskey & Olds, P.C.

(57) ABSTRACT

A method for controlling a multivariable system according to one non-limiting embodiment includes receiving a plurality of limits, receiving a first quantity of goals each having a desired value, and receiving sensor feedback. The method further includes estimating a basepoint in response to the first quantity of goals, the plurality of limits, and the sensor feedback, wherein the basepoint includes a set of values corresponding to an equilibrium point at which a predetermined amount of enabled limits are met and a second quantity of goals are fulfilled according to a goal prioritization scheme. Actuator requests are transmitted to a controlled system in response to the estimated basepoint. Predicted values from a mathematical model are compared to the sensor feedback, and the estimated basepoint is selectively adjusted in response to a difference between the predicted values and the sensor feedback in order to reduce the difference.

18 Claims, 4 Drawing Sheets

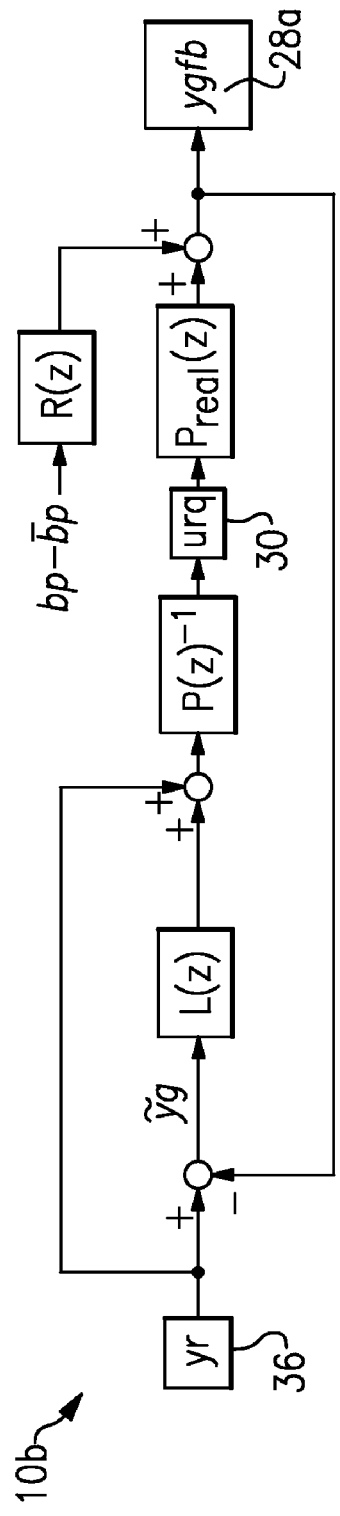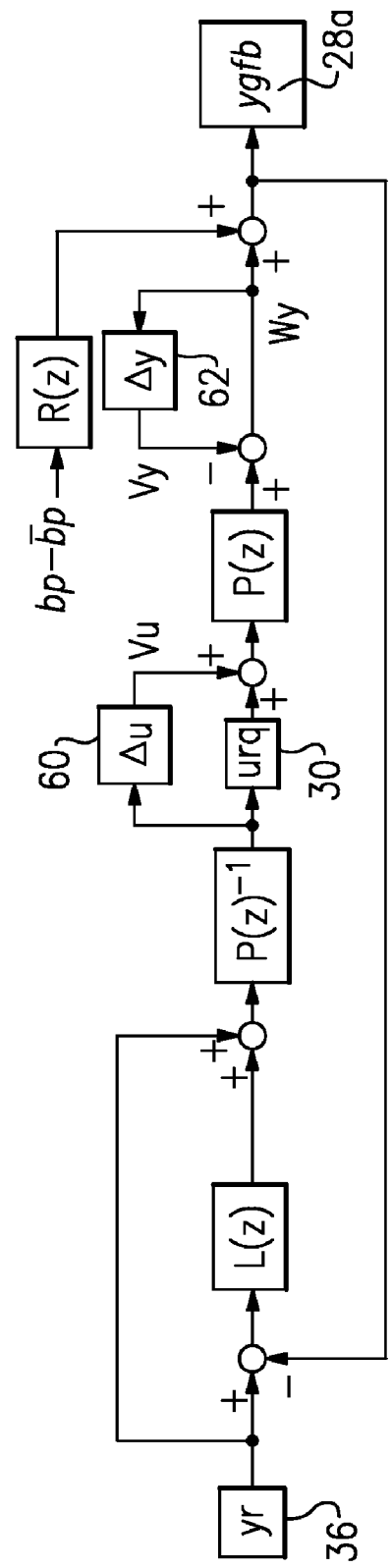
FIG.3
FIG.4

MULTIVARIABLE CONTROL SYSTEM

This invention was made with government support under Contract No.: N00019-02-C-3003 awarded by the Navy. The government may therefore have certain rights in this invention.

BACKGROUND OF THE INVENTION

This application relates to control systems, and more particularly to cross-coupled multivariable control systems.

In control theory, a given control system may have a plurality of goals and a plurality of limits. Limits are inequality constraints on system dynamic variables. An example limit may be to prevent an engine temperature from exceeding a certain temperature in order to prevent meltdown or rapid deterioration. Another might be to prevent a rotor speed from exceeding a certain angular velocity to maintain structural integrity. An example goal may be to achieve a certain engine thrust level, such as a thrust of 10,000 pounds. While it is desirable to achieve goals, it is necessary to meet limits. A multivariable system may include a number of effectors that can be adjusted to meet system goals and limits. In some cases, a system may be cross-coupled, which means that each effector change may affect goals and limits with varying dynamics. In a cross-coupled system, it is not possible to change a single effector in isolation to affect only single goal or limit, as a change in one effector may affect a plurality of goals or limits. Calculating effector commands in a cross-coupled multi-variable system can therefore be complex and computationally demanding, and it may be necessary to prioritize goals in order to meet all limits while best meeting a number of goals.

Most existing control systems are directed to single input, single output systems, or a system with a collection of inputs and outputs that are only loosely coupled. Cross-coupled multi-variable systems cannot be adequately controlled with such models. While some existing model predictive control technology can address both cross-coupled multi-variable requirements while enforcing limits, application of such technology has been limited to chemical process applications, which require updates only once every several minutes. Such a computational burden is not practical in a system, such as a vehicle control system, where updates may be required on the order of one hundred times per second.

SUMMARY OF THE INVENTION

A method for controlling a multivariable system according to one non-limiting embodiment includes receiving a plurality of limits, receiving a first quantity of goals each having a desired value, and receiving sensor feedback. A basepoint is estimated in response to the first quantity of goals, the plurality of limits, and the sensor feedback, wherein the basepoint includes a set of values corresponding to an equilibrium point at which a predetermined amount of enabled limits are met and a second quantity of goals are fulfilled according to a goal prioritization scheme. Actuator requests are transmitted to a controlled system in response to the estimated basepoint, with the actuator requests effecting change in the controlled system to enable the controlled system to meet the predetermined amount of enabled limits and to fulfill the second quantity of goals. Predicted values from a mathematical model are compared to the sensor feedback, and the estimated basepoint is selectively adjusted in response to a difference between the predicted values and the sensor feedback in order to reduce the difference.

A multivariable control system according to one non-limiting embodiment includes a microprocessor operable to execute a basepoint estimator algorithm to estimate a basepoint and prioritize a first quantity of goals each having a desired value in response to the first quantity of goals, a plurality of limits, at least one sensor feedback signal, and an output of a mathematical model. The basepoint estimator algorithm relaxes at least a portion of the first quantity of desired goals according to a relative goal prioritization scheme to meet a predetermined amount of the limits and to fulfill a second quantity of the goals. A plurality of sensors transmit the at least one sensor feedback signal, indicating current conditions of a controlled system, to the basepoint estimator algorithm. A plurality of actuators are operable to change dynamics of the controlled system in response to actuator requests received from the microprocessor, and a mathematical model is operable to predict behavior of the controlled system in response to the estimated basepoint and the actuator requests.

These and other features of the present invention can be best understood from the following specification and drawings, the following of which is a brief description.

BRIEF DESCRIPTION OF THE DRAWINGS

FIG. 3 schematically illustrates a simplified version of the multivariable control system of FIG. 2.

FIG. 4 schematically illustrates the multivariable control system of FIG. 3 with multiplicative and additive signals representing model errors.

DETAILED DESCRIPTION OF THE PREFERRED EMBODIMENT

Figure 1:
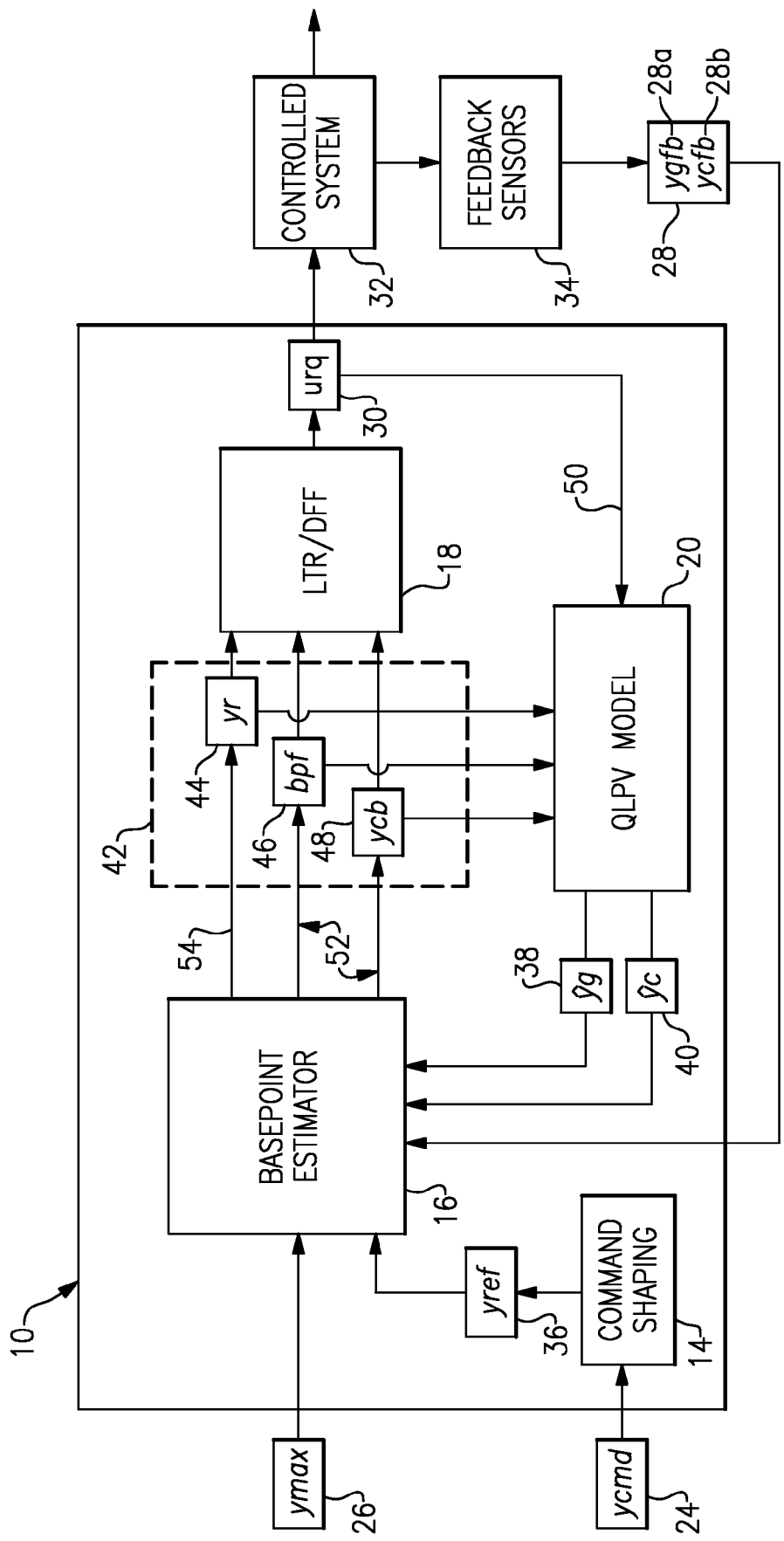
FIG. 1 schematically illustrates an example multivariable control system.

FIG. 1 schematically illustrates an example multivariable control system 10. The system 10 includes an optional command shaping module 14, a basepoint estimator 16, a loop transfer function recovery/dynamic feed forward ("LTR/DFF") module 18, and a mathematical model 20. The mathematical model 20 is designed to predict behavior of a controlled system 32 and represents system dynamics of the controlled system 32. In the example of FIG. 1, the mathematical model 20 is a quasi-linear parameter varying ("QLPV") model. However, it is understood that the mathematical model 20 would not have to be a QLPV model, and could be another type of model, such as a locally linearized model.

The system 10 is operable to receive a plurality of commands 24 ("ycmd"), a plurality of maximum or minimum values for limited variables, or "limits" 26 ("ymax"), and feedback signals 28 ("ygfb" and "ycfb") as inputs, and is operable to produce actuator requests 30 ("urq") in response to those inputs. Each limit has a desired range of values, and each goal has a desired value. The feedback signals 28 include a first feedback signal 28a ("ygfb") and a second feedback signal 28b ("ycfb"). However, it is understood that each of the feedback signals 28a, 28b may contain a plurality of feedback values, and may include signals in common.

Depending on a state of the controlled system 32, certain limits may be enabled and some may be disabled. For example, if the controlled system 32 is an aircraft, the aircraft may have a different set of limits that are of concern during take-off, flight, and landing. The term "enabled limits" refers to the limits that are of concern to the controlled system 32 at a given time.

The actuator requests 30 are transmitted to the controlled system 32 to effect change in the controlled system 32. The transmission of actuator requests 30 to the controlled system 32 includes transmitting the actuator requests 30 to actuators which control effectors. In one example the controlled system 32 is a vehicle, such as an aircraft 50 (see FIG. 5). However, it is understood that the multivariable control system 10 could be used to control other systems. Feedback sensors 34 transmit feedback signals 28 back to the system 10. The feedback sensors 34 measure variables for which there are goals or limits, or other variables that can be related to goals or limits via an onboard model.

The command shaping module 14 receives commands 24 and outputs a plurality of goals 36 ("yref"), which correspond to system goals. In one example the command shaping module 14 is operable to filter, range check, or rate limit the commands 24 to translate the commands 24 into goals 36. However, it is understood that the commands 24 could also be shaped or modified in other ways. For example, one could set the goals 36 ("yref") equal to the commands 24 ("ycmd").

The basepoint estimator 16 receives the goals 36, the limits 26, a plurality (first quantity) of predicted goal variables 38 ("ŷg"), a plurality of predicted limit variables 40 ("ŷc"), and the feedback signals 28, and processes these inputs to produce a basepoint estimate 42. The basepoint estimator 16 may also include a signal "Enab" (not shown) indicating which limits need to be enforced so that different operating conditions may enforce different limits. A basepoint is a set of values corresponding to an equilibrium point of a controlled system 32 at which a predetermined amount of enabled limits 26 are met and a second quantity of goals 36 are fulfilled according to a goal prioritization scheme. In one example the predetermined amount of enabled limits 26 corresponds to all of the maximum limits 26 of the system 10.

When a variable having a limit ("limited variable") reaches its limit value, it is termed "active" because the controlled system 32 must change its behavior to hold that limit. This requires taking an actuator, or actuator "degree of freedom", that may have been required to meet all goals, and using it to hold the active limit. As a consequence, one or more goals, or goal degrees of freedom, may have to be given up. The goal prioritization scheme determines what aspects of goals to give up for each permutation of active limits.

In one example the goal prioritization scheme is an absolute goal prioritization scheme in which the second quantity of goals are fulfilled by permitting a third quantity of goals to deviate from the desired value associated with each goal included in the third quantity of goals. In this scheme the third quantity of goals is equal to a number of active limits. The term "active limit" corresponds to a situation where a limit is met or nearly met. For example, if a limit is to prevent an engine temperature from exceeding a predetermined temperature, then the limit is active if the engine temperature is approximately equal to the predetermined temperature. When an enabled limit is inactive, the limit may be met without otherwise modifying a behavior of the controlled system 32. When an enabled limit is active, the behavior of the controlled system 32 may be modified in order to hold the limit.

In another example the goal prioritization scheme is a relative prioritization scheme in which each goal approximately meets its desired value. In this example, a quantity of goals that are permitted to deviate from desired values are said to be "relaxed." The amount of relaxation may be determined via an optimization procedure that minimizes a measure of the relaxation.

The basepoint estimate 42 from the basepoint estimator 16 includes internal reference values 44 ("yr"), free basepoint values 46 ("bpf") that do not have reference values, and basepoint values 48 ("ycb") associated with variables having limits, which are transmitted to the LTR/DFF module 18 and the QLPV model 20. The internal reference values 44 may also be referred to as "relaxed goals." The LTR/DFF module 18 is operable to determine how the behavior of the controlled system 32 should change in a subsequent sample period, and is also operable to produce actuator requests 30. In one example, the duration of the sample period may be on the order of one hundredth of a second. However, it is understood that other sample period durations could be used.

The QLPV model 20 is operable to receive the basepoint estimate 42 and the actuator requests 30 as inputs, to calculate the predicted goal variables 38 ("ŷg") and the estimated predicted limit variables 40 ("ŷc"), and to transmit the predicted goal variables 38 and the predicted limit variables 40 to the basepoint estimator 16. The predictions are for a next sample period of the system 10. The basepoint estimator 16 is operable to compare the predicted goal variables 38 and the predicted limit variables 40 from the QLPV model 20 model (predicted from the last prior system 10 update) to the associated sensor feedback 28, and to selectively adjust the basepoint estimate 42 in response to a difference between the predicted variables 38, 40 and the sensor feedback 28.

As shown in FIG. 1, the system 10 includes a first internal loop 50, an external loop 52, and a second internal loop 54, where the loops are designed by the variables they control. With the first internal loop 50, the LTR/DFF module 18 selectively adjusts the actuator requests 30 to reduce a difference between the predicted goal variables 38 and the internal reference values 44. To prevent adverse interactions between the first internal loop 50 and the other loops 52, 54, a designer may choose to make the loop 50 operate very quickly. This is possible because the loop 50 is an internal feedback loop and thus may be implemented without feedback signal latency or unplanned variations in loop elements. To those skilled in the art, this is known as loop transfer function recovery ("LTR"). Since the loop 50 also quickly responds to the internal reference values 44 ("yr"), it may also have aspects of what is known as dynamic feedforward ("DFF") in the art. In one example, the first internal loop 50 reduces the difference between predicted goal variables 38 and internal reference values 44 to zero at each system 10 sample period.

With the external loop 52, the basepoint estimator 16 selectively adjusts the free basepoint values 46 ("bpf") and the basepoint values 48 ("ycb") to reduce a difference between the predicted goal variables 38 and the feedback signal 28a, and to reduce a difference between the predicted limit variables 40 and the feedback signal 28b. The external loop 52 is external in that it relies on the feedback signals 28 from the controlled system 32 and therefore the feedback signals 28 may include more latency (e.g. time delay) than the internal loops 50, 54. In one example, the external loop 52 is operable to tolerate unplanned variations of the controlled system 32. For these reasons, the feedback loop 52 which sets the basepoint values 46 ("bpf") and 48 ("ycb") may pace the dynamic response of the system 10. The interplay of the external feedback loop 52 and the internal loop 50 may be such that dynamics with which the system output 28a approaches the internal reference values 44 can be made essentially the same as (i.e. recovered by) the dynamics with which predicted goal variables 38 and predicted limit variables 40 approach the feedback signals 28a, 28b.

With, the second internal loop 54, the basepoint estimator 16 selectively adjusts the internal reference values 44 to ensure that the predicted limit variables 40 do not exceed their respective limits 26. The second internal loop 54 determines how goals are relaxed in order to hold active limits. The difference between the resulting internal reference values 44 and the desired reference values 36 is the degree to which goals are relaxed in order to hold active limits. When no limits are active, signals 44 and 36 may be approximately or exactly equal. When one limit is active, signal 44 may deviate from signal 36 by one degree of freedom. If two limits are active, signal 44 may deviate from signal 36 by two degrees of freedom, and so on.

Figure 2:
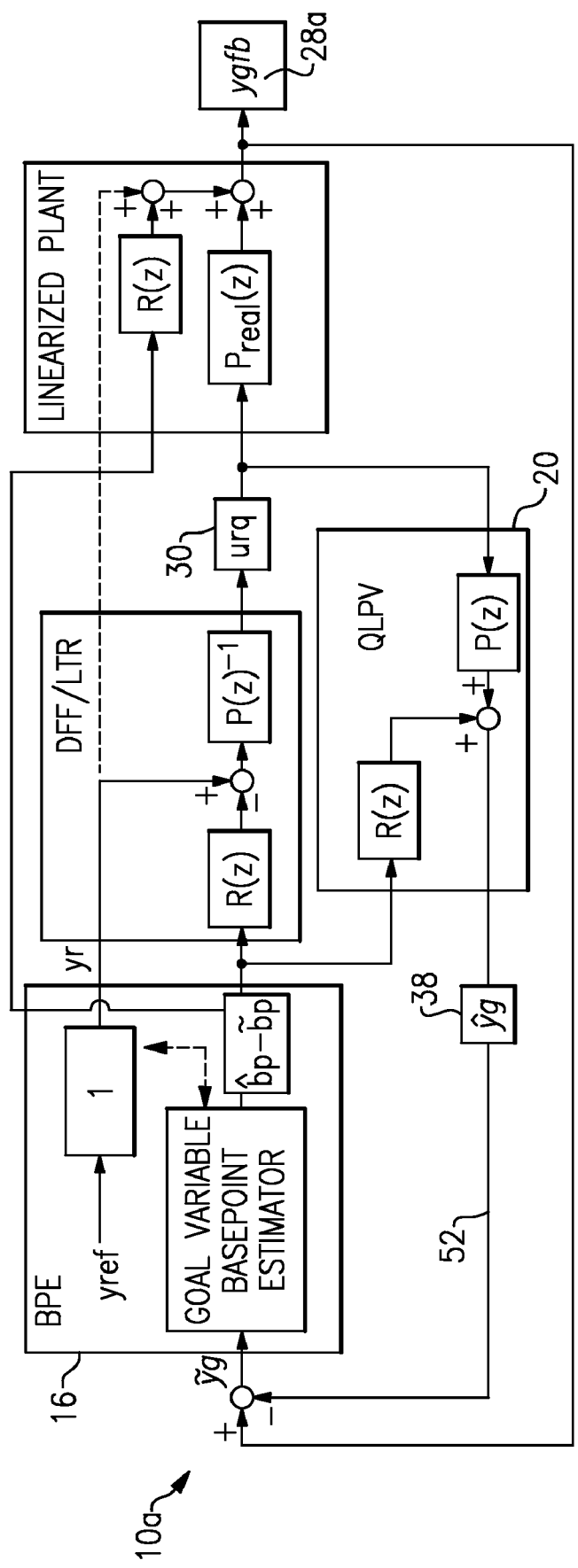
FIG. 2 schematically illustrates a simplified version of the multivariable control system of FIG. 1 when no limits are active.

FIG. 2 schematically illustrates a simplified multivariable control system 10a, which is a simplified version of the multivariable control system 10 of FIG. 1, and is explanatory when no limits are active (i.e. any variable having a limit is not at its limit). In this simplified example, the second internal feedback loop 54 is not relevant, and is not shown, and yr is set equal to yref. Also, in this example the basepoint estimator 16 is reduced to a "goal variable basepoint estimator" that does not need to estimate yr or ycb because we presume that yr and yref are equal and that ycb is not relevant. Furthermore, the simplified multivariable control system 10a assumes that the first internal loop 50 has continuously accomplished its goal so quickly that there is essentially no difference between the predicted goal variables 38 and the reference values 44, and thus for analysis purposes the predicted goal variables 38 are assumed to be equal to the reference values 44. To those skilled in the art this is a common approximation concerning the dynamic interaction of two feedback loops when one loop is much faster than the other. The approximation is meant to aid understanding and the design of feedback loop 52 as shown in FIG. 1.

FIG. 2 incorporates the concept of a true set of free basepoint values 46 ("bpf") that correspond to the desired response yr, and the concept that bpf and yr together are the true equilibrium of the controlled system 32. Furthermore, FIG. 2 incorporates the conceptual linearization of the true system dynamic behavior about this equilibrium point. This linearized model is a conceptual aid to analysis, and is represented by the following equation:

$$ygfb = P_{real}(z) \cdot urq + R_{real}(z) \cdot (bpf - \overline{b}pf) \qquad \text{equation \#1}$$

where $P_{real}$ and $R_{real}$ are transfer functions.

This is a conceptual model only because $P_{real}$, $R_{real}$, and bpf may not be accurately known for a particular build of the system operating in its current environment. The fact that this inaccuracy may cause ygfb to be inaccurate to an unacceptable degree is one reason why a feedback controller is necessary in the first place. The system 10 includes an approximate linear model similar to equation #1, but where approximations P(z), R(z), and estimated bpf are only used in place of the unknown true values. This is termed the "quasi linear parameter varying" ("QLPV") model 20. The simplified view of the controller 10a shown in FIG. 2 also includes the QLP model 20.

FIG. 2 illustrates a simplified case in which no limits are active, and the basepoint estimator 16 is reduced to a goal variable basepoint estimator. The goal variable basepoint estimate in the system 10a implements equation #2, shown below.

$$\hat{b}p - \overline{b}p = R(z)^{-1} L(z) \cdot \tilde{y}g \qquad \text{equation \#2}$$

where $\hat{b}p$ is an estimate 46 of the true basepoint values,
$\overline{b}p$ is an a priori estimate of the true basepoint values,
P(z) and R(z) are z domain transfer function matrices modeling the goal output responses ("ygfb") to changes in the actuator requests urq and basepoint values 46, respectively,
L(z) is a selected loop transfer function, and
$\tilde{y}g$ is an estimation error for the predicted goal variables 38 ("$\tilde{y}g$").

Equations #3, 4, and 5 shown below may be used to solve for the estimation error $\tilde{y}g$. In some forms of QLPV models, R(z) is readily inverted. To aid a designer in selecting L(z), the following analysis shows the relationship between L(z) and the dynamics of estimation error ("$\tilde{y}g$") reduction, expressed in the common form of z-domain transfer function matrices.

$$\tilde{y}g = P_{real}(z) \cdot urq + R(z) \cdot (bp - \overline{b}p) - P(z) \cdot urq - R(z) \cdot (\hat{b}p - \overline{b}p) \qquad \text{equation \#3}$$

Substituting the operation of the basepoint estimator 16 (see equation #2) into equation #3 results in the following:

$$(I + L(z)) \tilde{y}g = (P_{real}(z) - P(z)) \cdot urq + R(z) \cdot (bp - \overline{b}p) \qquad \text{equation \#4}$$

where I is an identity matrix. Multiplying through by an inverse of the matrix on the right yields the following:

$$\tilde{y}g = S(z) \cdot \{(P_{real}(z) - P(z)) \cdot urq + R(z) \cdot (bp - \overline{b}p)\} \qquad \text{equation \#5}$$

where the following new quantities are defined:

$$S(z) \equiv (I + L(z))^{-1} \qquad \text{equation \#6}$$

$$\Delta(z) : P_{real}(z) = (I + \Delta(z))^{-1} P(z) \qquad \text{equation \#7}$$

where S(z) is a matrix of transfer functions describing how the dynamics of goal output estimation error is driven by model errors Preal−P and bpf−$\overline{b}$pf. The definition shown in equation #7 may be used later, for example in equation #11.

When S=I, equation #5 represents the effect of model errors on yg prediction errors. A purpose of the basepoint estimator is to make the gains of S(z) less than one over the desired range of frequencies (i.e. a range of z). One skilled in the art would know how to specify an L(z) that results in the gains of S(z) being less than one over a frequency range of interest, indicating an attenuation of model errors, and how to specify an L(z) so that the L(z) approaches zero at high frequency, to improve stability robustness. One skilled in the art would also know how to design L(z) such that the estimation approaches zero in steady state.

FIG. 3 schematically illustrates a simplified multivariable control system 10b that is a simplified version of the multivariable control system 10a of FIG. 2. The system 10b isolates items that do not vary when limits are active. In the example of FIG. 3, the actuator requests 30 are chosen so that the predicted goal variables 38 are continuously equal to the internal reference values 44, per the QLPV model 20. Thus, the LTR/DFF module 18 can be described by the transfer function $P^{-1}(z)$, which results in the following control signal:

$$urq = P^{-1}(z) \cdot (yr - R(z)(\hat{b}pf - bpf)) \qquad \text{equation \#8}$$

In FIG. 3, the estimated goal output and associated logic blocks of FIG. 2 are simply replaced with yr. Equations #9 and #10 below illustrate the behavior of the system 10b, in which the system 10b is able to recover a desirable estimator loop gain L(z).

$$ygfb = R \cdot (bp - \overline{b}p) + P_{real}(z) \cdot P^{-1}(z) \cdot (yr + L(z)(yr - ygfb)) \qquad \text{equation \#9}$$

where bp is a basepoint.

$$ygfb = R \cdot (bp - \overline{b}p) + P_{real}(z) \cdot P^{-1}(z) \cdot (I + L(z)) yr - P_{real}(z) \cdot P^{-1}(z) \cdot L(z) \cdot ygfb \qquad \text{equation \#10}$$

$$yerr = R_{real}(bpf - \overline{b}pf) + (I + \Delta(z))^{-1} L(z) yerr + [(I + \Delta(z))^{-1} - I] yr \qquad \text{equation \#11}$$

where yerr is a difference between ygfb and yr.
Solving for yerr yields the following:

$$yerr = (I + S(z)\Delta(z))^{-1} \{S(z) \cdot (I + \Delta(z)) \cdot R_{real}(z) \cdot (bp - \overline{b}p) - S(z) \Delta yr\} \qquad \text{equation \#12}$$

Assuming the error terms are relatively small, and dropping terms that are second order yields the following approximation:

$$yerr = S(z) \cdot R_{real}(z) \cdot (bp - \overline{b}p) - S(z) \Delta(z) yr \qquad \text{equation \#13}$$

Equation #13 shows the dynamics of response error yerr are the same as those of the estimation errors (see equation #5) replacing P*urq with yr. Thus, a desirable feedback loop transfer function selected by a designer for the estimation error dynamics may be "recovered" for output tracking errors of the controlled system 32.

FIG. 4 schematically illustrates the multivariable control system of FIG. 3 with $P_{real}(z)$ broken up into input multiplicative error signal 60 ("$\Delta u$") and output multiplicative error signal 62 ("$\Delta y$"). One skilled in the art of robust control law design theory would understand how to break up a signal into input and output multiplicative error signals with what is known as a linear fractional transformation. A linear fractional transformation analysis, as shown in equations 14-20 below, may be performed to determine the impact of the multiplicative error signals 60, 62.

$$Wy = -Vy + P \cdot Vu + yr + L(yr - R \cdot (bp - \overline{b}p) - Wy) \quad \text{equation \#14}$$

where Vu is a signal corresponding to the multiplicative error 60 ("$\Delta u$"), and
Wy is an output of the P(z) transfer function.

$$(I+L)Wy = -Vy + P \cdot Vu + (I+L)yr - L \cdot R \cdot (bp - \overline{b}p) \quad \text{equation \#15}$$

where Vy is a signal corresponding to the multiplicative error signal 62 ("$\Delta y$"). The dynamic response, expressed in the z-domain, can be expressed in the following equation:

$$\begin{bmatrix} Wy \\ urq \end{bmatrix} = \begin{bmatrix} -S & S \cdot P \\ P^{-1}T & -P^{-1}T \cdot P \end{bmatrix} \begin{bmatrix} Vy \\ Vu \end{bmatrix} + \begin{bmatrix} I & -T \\ P^{-1} & -P^{-1}T \end{bmatrix} \begin{bmatrix} yr \\ R \cdot (bp - \overline{b}p) \end{bmatrix} \quad \text{equation \#16}$$

where S and T are a consequence of linkage, as defined in equation #6, S indicates attenuation disturbances, and T is a closed loop transfer function. S and T are related as shown in equation #17 below:

$$T = I - S(z) \quad \text{equation \#17}$$

From FIG. 4, the multiplicative model errors relate terms in equation #16 as shown in equation #18 below.

$$\begin{bmatrix} Vy \\ Vu \end{bmatrix} = \begin{bmatrix} \Delta y & 0 \\ 0 & \Delta u \end{bmatrix} \begin{bmatrix} Wy \\ urq \end{bmatrix} \quad \text{equation \#18}$$

Equation #18 can be substituted into equation #16, and can be solved for Wy and urq as shown in equation #19 below.

$$\begin{bmatrix} Wy \\ urq \end{bmatrix} = \quad \text{equation \#19}$$

$$\left\{ I + \begin{bmatrix} S & -S \cdot P \\ -P^{-1}T & P^{-1}T \cdot P \end{bmatrix} \begin{bmatrix} \Delta y & 0 \\ 0 & \Delta u \end{bmatrix} \right\}^{-1} \left\{ \begin{bmatrix} I & -T \\ P^{-1} & -P^{-1}T \end{bmatrix} \begin{bmatrix} yr \\ R \cdot (bp - \overline{b}p) \end{bmatrix} \right\}$$

In equation #20 as shown below, Wy is replaced by feedback signal 28a ("ygfb").

$$\begin{bmatrix} ygfb \\ urq \end{bmatrix} = \left\{ I + \begin{bmatrix} S & -S \cdot P \\ -P^{-1}T & P^{-1}T \cdot P \end{bmatrix} \begin{bmatrix} \Delta y & 0 \\ 0 & \Delta u \end{bmatrix} \right\}^{-1} \quad \text{equation \#20}$$

$$\left\{ \begin{bmatrix} I & S \cdot (I + \Delta y) \\ P^{-1} & -P^{-1}T \cdot (I + \Delta y) \end{bmatrix} \begin{bmatrix} yr \\ R \cdot (bp - \overline{b}p) \end{bmatrix} \right\}$$

Equation #20 is in a common form for analyzing the basic feedback control tradeoff of the level of stability robustness versus amount of attenuation of model errors. One skilled in control theory would know how to use the first equation #20 { } term to determine stability margins and would know how to use the second { } term to analyze model error attenuation.

Thus far, the design approach has neglected the effect of active limits. This is practical if the following dynamics are designed to be independent and uncoupled from each other: (1) the yg estimation error attenuation (and thus ygfb error attenuation), (2) the ycb estimation error attenuation, and (3) the yr departure from yref, to hold active limits.

The design can be summarized as the following: (1) design of the portion of the basepoint estimator 16 that estimates bpf as in equation #2 and optionally using equation #20 to guide the selection of a robust L(z), (2) design of the LTR/DFF as in equation #8, and (3) design of a portion of the basepoint estimator 16 that adjusts ycb to include a term that decouples ycb dynamics from changes in yr to hold limits. One skilled in control theory will know that the designs can be done in the frequency domain, as above, or equivalently in the time domain. A basepoint estimator 16 meeting all of these requirements is described in commonly-assigned, co-pending U.S. application Ser. Nos. 12/115,570 and 12/169,183, both of which are incorporated by reference.

Figure 5:
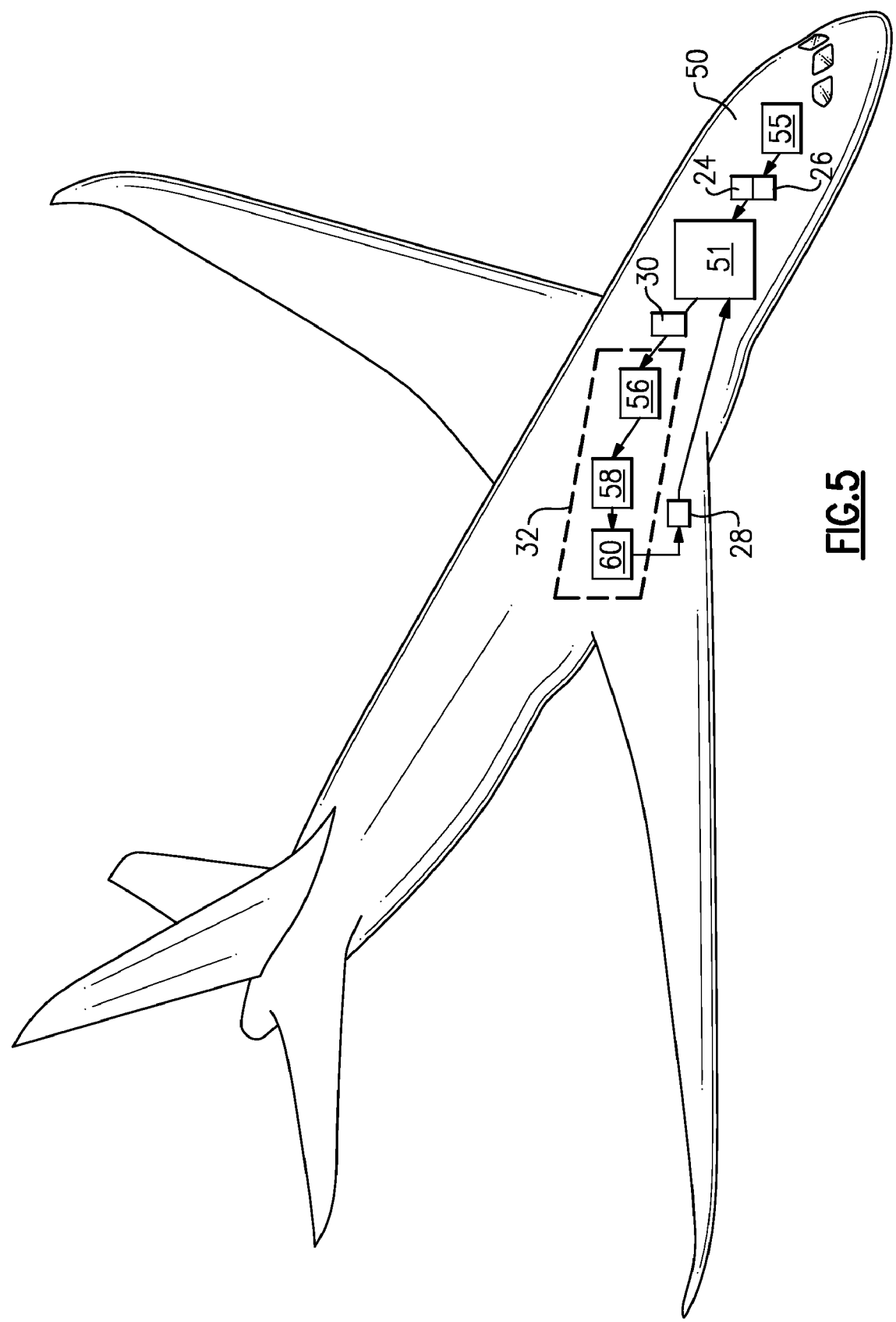
FIG. 5 schematically illustrates an example aircraft application for the multivariable control system of FIG. 1.

FIG. 5 schematically illustrates an example aircraft application for the multivariable control system of FIG. 1. An aircraft 50 includes a microprocessor 51 which is operable to receive commands 24 and limits 26 from a control 55. The control 55 may include a cockpit where a pilot provides commands. The microprocessor transmits actuator requests 30 to a controlled system 32, which includes actuators 56, effectors 58, and a turbine engine 60. The actuators are operable to transmit actuator requests to effectors 58 which control the turbine engine 60 to effect change in behavior of the aircraft 50. Feedback signals 28 may be transmitted back to the microprocessor 51 to adjust future actuator requests. While FIG. 5 discloses the example aircraft application, it is understood that this invention is not limited to aircraft, and could also be used in other vehicle applications, such as that of an automobile or helicopter, or in other system applications, such as an HVAC system.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method for controlling a multivariable system, comprising:
    receiving a plurality of limits;
    receiving a first quantity of goals, wherein each goal has a desired value;
    receiving sensor feedback;
    estimating a basepoint in response to the first quantity of goals, the plurality of limits, and the sensor feedback, wherein the basepoint includes a set of values corresponding to an equilibrium point at which a predetermined amount of enabled limits are met and a second quantity of goals are fulfilled according to a goal prioritization scheme;
    transmitting actuator requests to a controlled system in response to the estimated basepoint, wherein the actuator requests effect change in the controlled system to enable the controlled system to meet the predetermined amount of enabled limits and to fulfill the second quantity of goals;
    comparing predicted values from a mathematical model to the sensor feedback; and selectively adjusting the estimated basepoint in response to a difference between the predicted values and the sensor feedback in order to reduce the difference.

2. The method of claim 1, wherein the predetermined amount of limits corresponds to all of the plurality of limits.

3. The method of claim 1, wherein the goal prioritization scheme is an absolute goal prioritization scheme in which the second quantity of goals are approximately fulfilled by permitting a quantity of goal degrees of freedom to deviate from a plurality of reference values.

4. The method of claim 1, wherein the goal prioritization scheme is a relative prioritization scheme in which the second quantity of goals are approximately fulfilled by permitting a quantity of goal degrees of freedom to deviate from a plurality of reference values.

5. The method of claim 1, further comprising receiving at least one command as an input.

6. The method of claim 5, further comprising selectively filtering the at least one command to provide the first quantity of goals.

7. The method of claim 1, wherein the multivariable system is cross-coupled, such that each effector command may affect a plurality of the goals and limits.

8. The method of claim 1, wherein the mathematical model is a quasi-linear parameter varying model.

9. The method of claim 1, wherein the mathematical model is a locally linearized model.

10. A multivariable control system, comprising:
a microprocessor operable to execute a basepoint estimator algorithm to estimate a basepoint and to prioritize a first quantity of goals each having a desired value in response to the first quantity of goals, a plurality of limits, at least one sensor feedback signal, and an output of a mathematical model,
wherein the basepoint includes a set of values corresponding to an equilibrium point at which a predetermined amount of limits are met and a second quantity of goals are fulfilled according to a relative goal prioritization scheme, and
wherein the basepoint estimator algorithm relaxes at least a portion of the first quantity of goals according to the relative goal prioritization scheme to meet the predetermined amount of limits and fulfill the second quantity of goals;
a plurality of sensors that transmit the at least one sensor feedback signal indicating current conditions of a controlled system to the basepoint estimator algorithm; and
a plurality of actuators for changing dynamics of the controlled system in response to actuator requests received from the microprocessor, wherein the mathematical model is operable to predict a behavior of the controlled system in response to the estimated basepoint and the actuator requests.

11. The system of claim 10, wherein the predetermined amount of enabled limits corresponds to all of the plurality of limits received by the multivariable control system.

12. The system of claim 10, wherein the mathematical model is a quasi-linear parameter varying model.

13. The system of claim 10, wherein the plurality of actuators are operable to control a plurality of effectors to modify behavior of the controlled system.

14. The system of claim 10, further comprising a command shaping algorithm operable to filter or limit or rate limit commands and transmit goals to the basepoint estimator algorithm.

15. The system of claim 10, further comprising a first internal feedback loop that selectively adjusts a plurality of actuator requests to reduce a difference between a plurality of estimated goals from the mathematical model and a plurality of internal reference values.

16. The system of claim 10, further comprising an external feedback loop that selectively adjusts a plurality of basepoint values to reduce a difference between a plurality of mathematical model predictions and a plurality of feedback signals.

17. The system of claim 10, further comprising a second internal feedback loop that selectively adjusts a plurality of internal reference values to ensure that a plurality of estimated limits do not exceed a plurality of maximum limits, wherein the internal reference values correspond to relaxed versions of the desired goal reference values.

18. The system of claim 10, wherein the basepoint estimator algorithm is operable to calculate internal reference values for which there is an associated equilibrium point that meets all received and enabled limits.

\* \* \* \* \*